UNITED STATES PATENT OFFICE.

JOHN ROOK, OF WASHINGTON, DISTRICT OF COLUMBIA.

FIRE-KINDLER.

SPECIFICATION forming part of Letters Patent No. 360,917, dated April 12, 1887.

Application filed January 22, 1886. Renewed November 23, 1886. Serial No. 219,743. (No specimens.)

*To all whom it may concern:*

Be it known that I, JOHN ROOK, a citizen of the United States, residing at Washington, in the District of Columbia, have invented certain new and useful Improvements in Fire-Lighters; and I do hereby declare the following to be a full, clear, and exact description of the invention, such as will enable others skilled in the art to which it appertains to make and use the same.

My invention relates to that class of fire-lighters in which pulverized wood or its equivalent is mixed with an inflammable fluid and afterward allowed to cool and become solidified, for the purpose of handling. Heretofore these lighters have been made of such a composition that as soon as lighted the small particles would become disengaged, and when used in a stove-grate would fall through the same, thus scattering the fire and dissipating the heat, and greatly impairing their efficiency.

The object of my invention is to produce a fire-lighter which can be sold at a reduced price, and when lighted will not burn out too rapidly, but remain intact while burning, so that the heat will be concentrated upon the fire-wood and the lighter made much more effective; and to this end my invention consists in mixing together wood-sawdust, resin, pine-tar, and charcoal, in the following manner and proportions.

Fifty pounds of resin is placed in a suitable receptacle and heated to about 190° Fahrenheit. To this is added seven and one-half quarts of pine-tar at a temperature of 100°, and the two are stirred together. This operation expands the resin and tar to more than double its original bulk. Next add seven and one-half quarts of pulverized charcoal, and when the whole matter reaches boiling-point add two bushels of sawdust and mix the whole composition together as thoroughly as possible. While in a liquid condition the composition can be poured upon a flat surface, and before hardening it may be molded into cakes of any suitable form for handling or use.

The advantage of mixing the composition together in this way is that its efficiency is increased, a larger bulk of material is produced, and the article can be sold to the consumer at a greatly-reduced price.

When the composition becomes solidified by cooling, it forms a crystallized mass, which can be handled without soiling the hands. Ordinary heat will not affect it, and in summer it may be allowed to stand in the sun without injury to its form or making it too sticky to be handled with facility.

I do not claim the use of oil or spirits of turpentine as one of the elements of my composition, as it would not answer my purpose.

Having thus described my invention, what I claim as new, and desire to secure by Letters Patent, is—

1. A fire-lighter composed of resin, pine-tar, pulverized charcoal, and wood-sawdust, mixed together in the proportions and manner substantially as described.

2. An improvement in the art of making fire-lighters, which consists in first mixing together resin and tar in a heated state and afterward adding and mixing therewith sawdust and charcoal in the manner substantially as described.

In testimony whereof I affix my signature in presence of two witnesses.

JOHN ROOK.

Witnesses:
R. G. DU BOIS,
ANDREW PARKER.